Nov. 4, 1941.                B. A. OLSEN                2,261,445
                       COATING MACHINE AND DRIER
                         Filed July 29, 1940
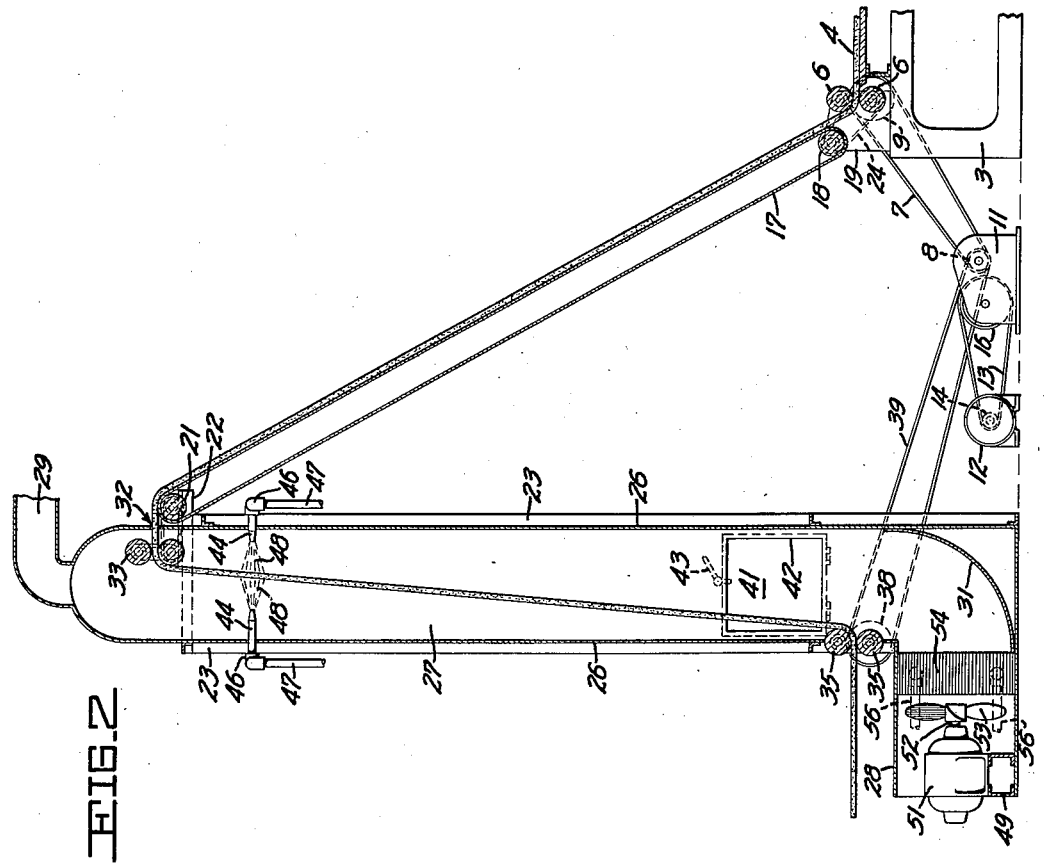
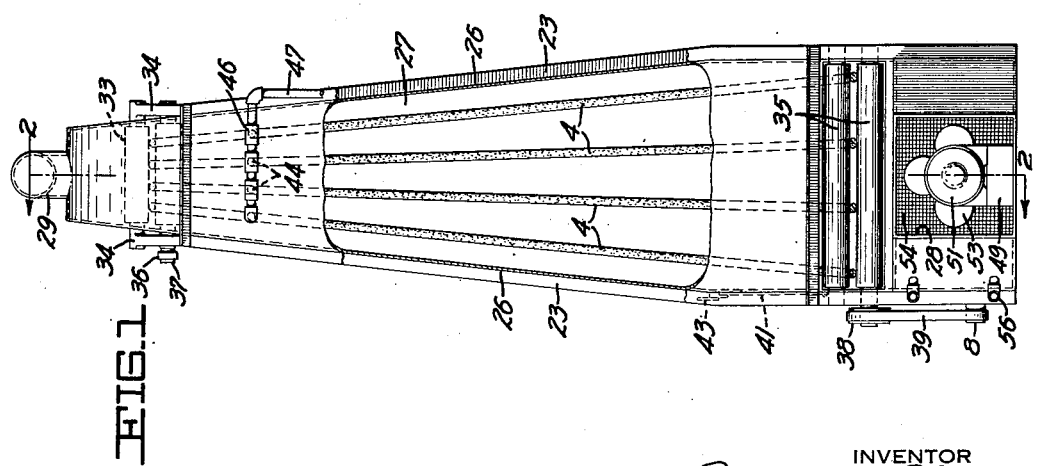
INVENTOR
Burton A. Olsen
BY
Harry C. Schroeder Patented Nov. 4, 1941

2,261,445

UNITED STATES PATENT OFFICE 2,261,445

COATING MACHINE AND DRIER

Burton A. Olsen, Oakland, Calif., assignor to California Cotton Mills Company, Oakland, Calif., a corporation of California Application July 29, 1940, Serial No. 348,237

5 Claims. (Cl. 91—55)

This invention relates to devices for applying surface coatings to continuously moving webs or cords and for thereafter drying or curing said surface coatings.

It is an object of the invention to provide a machine adapted for surface coating material of such low tensile strength as loosely felted cotton.

Another object of the invention is to provide a combined coating and drying machine which occupies a minimum of floor space.

A further object of the invention is to provide, in a machine of the character described having a chamber through which the material to be treated is conducted and into which a current of coating material is discharged to surface coat the material to be treated, means for directing an additional current of fluid into the chamber for simultaneously drying or curing said surface coating and for exhausting from the chamber excesses of said coating material.

A still further object of the invention is to provide, in a machine of the type referred to in which an enclosed chamber is provided through which the material to be treated is conducted and into which a spray of vaporized coating material is discharged to coat said material to be treated, means for maintaining excesses of said vaporized coating material in the chamber in close proximity to the material to be coated so that a lesser amount of the coating material is wasted.

The invention possesses other objects and features of advantage which, together with the foregoing, will be specifically brought forth in the detailed description of the invention hereunto annexed. It is to be understood that the invention is not to be limited to the specific form thereof herein shown and described as various other embodiments thereof may be employed within the scope of the appended claims.

Referring to the drawing:

Figure 1 is an end elevational view of the combined coating and drying machine of my invention. A portion of the view is broken away so as to more clearly disclose the interior construction.

Figure 2 is vertical sectional view of the machine and associated apparatus. The plane in which the view is taken is indicated by the line 2—2 of Figure 1.

In detail, I have shown in the drawing the output end of a machine 3 which may be the batt-forming machine described in my prior application Serial No. 348,236, filed July 29, 1940, or another machine in which sheet, slitted or felted fibrous material 4 to be coated is discharged through a pair of feed rollers 6 driven by a belt 7, and pulleys 8 and 9, from a speed reduction gear 11 which, in turn, may be driven from a motor 12 through a belt 13 and pulleys 14 and 16. The material 4 to be coated, after passing through the feed rollers 6 passes onto the lower end of an upwardly inclined endless conveyor belt 17 tractionally engaging, at its lower end, a drive pulley 18, journaled in the bracket 19 which carries the feed rollers 6, and, at its upper end, an idler pulley 21 journaled on header bars 22 carried by the upper ends of vertically extending frame members 23. A belt or chain 24, engaging pulleys or sprockets carried, respectively, by the drive pulley 18 and the lower feed roller 6, serves to connect the conveyor belt 17 to be driven by the motor 12 so that the material 4 to be coated is carried upwardly by the belt 17. The angular inclination of the belt 17 should not be toward the vertical to such a degree that little or no tractional engagement between the belt and the material 4 carried thereby will be had for the reason that the loosely felted material 4 possesses very little tensile strength and is very likely to pull apart should the upper reach of the run of the material be required to support the weight of the lower portion of the run. It will therefore be seen that a belt having little vertical rise, as compared to horizontal reach, is most desirable.

The frame members 23 support plates 26 forming an axially vertical chamber 27 provided at its lower end with an axially horizontal inlet duct 28 and at its upper end with a discharge duct 29. A curved deflector plate 31 is positioned within the lower end of the chamber 27 in alinement with the inlet duct 28. The side plates of the chamber 27, as will be noted in Figure 1, converge upwardly so that the cross-sectional area of the chamber is greater at its lower end than at the upper end thereof. The material 4 to be coated, after leaving the upper end of the conveyor belt 17, passes into the chamber 27, through an entrance aperture 32 provided adjacent the upper end of the rear plate 26, thence between a pair of guide rolls 33, journaled in brackets 34 carried by the header bars 22, thence downwardly longitudinally of the chamber, and between a pair of output feed rolls 35 positioned in an aperture formed adjacent the lower end of the front plate 26 and journaled in suitable bearings carried by the frame members 23. The lower of the guide rolls 33 is connected, by a belt 36 and pulleys 37, to be driven by the upper idler pulley 21 of the conveyor belt 17 and the lower of the output feed rolls 35 is provided with a pulley 38 driven by a belt 39 from the pulley 8 of the speed reduction gear 11. Driving the guide roll 33 from the conveyor belt and the output feed roll 35 from the reduction gear will move the material 4 to be coated longitudinally through the chamber 27. A door 41, hinged over an opening 42 formed in one of the side plates 26 and secured by a latch 43, permits access to the chamber for inspection purposes or for threading the material to be coated through the chamber at the start of a run.

Spray nozzles 44, fed from headers 46 connected to supply pipes 47 through which liquid spray material flows under pressure, are positioned in horizontally alined groups extending into the chamber 27 adjacent the upper end of the latter so as to project the spray 48 onto the descending material 4 and form a surface coating thereon. The coating material may be any one of several liquids depending on the use to which the material 4 is to be afterward put. Where the finished product is to be used, as described in my prior application Serial No. 322,315, filed March 5, 1940, as stemming wads for plugging earth bores used in blasting operations, the coating material used is an aqueous solution of sodium silicate. Sufficient of this coating material is sprayed on the material 4 to penetrate only a short distance below its surface so that, upon being dried, the material will possess a crust serving to prevent separation of the surface fibers and maintaining the shape of the finished wad or strip.

Mounted on brackets 49, within the inlet duct 28, is a motor 51 whose shaft 52 carries a screw propeller 53 adapted to create a flow of air through a cellular radiator 54 also positioned within the inlet duct. Pipes 56 serve to circulate hot water through the water passages of the radiator. The current of air, forced through and heated by the radiator, strikes the deflector plate 31, is directed upwardly through the chamber 27, and is then exhausted through the discharge duct 29 thus drying the material 4 as it passes the spray nozzles 44 and before it passes from the chamber between the output feed rollers 35. Due to the gradual narrowing of the chamber 27 from the bottom to the top thereof the natural expansion and subsequent cooling of the air current as it rises through the chamber is counteracted thus producing a uniform heat in the chamber along the exposed length of the material 4. The converging form of the chamber also produces another desirable result. A considerable quantity of sprayed liquid from the nozzles 44 will not immediately settle on the material 4 but will gradually sink toward the lower end of the chamber where it will be met by the rising current of air and will be suspended in the chamber until it eventually settles on the walls 26 or on the material 4. Since the air column becomes more dense as it ascends, due to the gradual decrease in cross-sectional area of the chamber, the excess vapor, excepting very large drops, from the spray nozzles will be concentrated in a zone just below the nozzles where most of it will be held until, as stated above, it settles on the inner wall of the chamber or upon the material to be coated. An appreciable quantity of sprayed material, which would otherwise be wasted, is thus conserved and put to use.

While I have chosen to illustrate the machine of my invention as used for coating strips or cords of fibrous materials it will be understood that it may be used as well in the treatment of sheet material. It will also be seen that the machine is capable of high speed operation.

Having thus described my invention in detail, what I claim as new and desire to secure by Letters Patent is:

1. A machine of the character described comprising a housing having a vertically extended chamber therein longitudinally through which a web of material may be moved, said housing having adjacent its upper and lower ends openings through which, respectively, said web of material may enter and leave said chamber, means for guiding and moving said web of material through the upper opening of said chamber, means for moving said web of material through the lower opening of said chamber, spray means within said chamber and adjacent the upper end thereof for applying a liquid surface-coating to said web of material, and means for moving a current of heated air upwardly through said chamber for drying said surface-coating of the web of material.

2. A machine of the character described comprising a housing having upwardly converging side walls enclosing a vertically extended wedge-shaped chamber through which a web of material may be passed, said housing having, at its upper end, an outlet port and an inlet aperture and, at its lower end, an inlet port and an outlet aperture, an inlet duct communicating with said inlet port and positioned axially normal to the longitudinal axis of said chamber, a vertically inclined belt conveyor mounted externally of said housing, terminating adjacent said inlet aperture and on which said web of material may be directed toward said inlet aperture, feed rolls adjacent said inlet and outlet apertures tractionally engaging said web of material for moving said web of material through the inlet aperture and into said chamber, longitudinally through the chamber, and out of the chamber through the outlet aperture, means for driving said feed rolls, a plurality of spray nozzles in said chamber positioned adjacent the inlet aperture for depositing on said web of material a surface-coating of liquid material, a pervious heat exchange device in said inlet duct, a motor-driven impeller in said inlet duct for forcing a current of air through the inlet duct and heat exchange device to enter said chamber, and an arcuate deflector plate at the point of intersection of said inlet duct and chamber for deflecting said current of air to pass longitudinally of said chamber toward the outlet port thereof.

3. Means for spraying and drying continuous fibrous material which comprises a vertically elongated housing, means for feeding continuous fibrous material downwardly through said housing, spray nozzles adjacent the upper end of said housing, and means for forcing a current of air upwardly through said housing.

4. Means for spraying and drying continuous fibrous material which comprises a verticaly elongated housing, means for feeding continuous fibrous material downwardly through said housing, spray nozzles adjacent the upper end of said housing, and means for heating and forcing a current of air upwardly through said housing.

5. Means for spraying and drying continuous fibrous material which comprises a vertically elongated tapered housing whose cross-sectional area decreases upwardly, means for feeding continuous fibrous material downwardly through said housing, spray nozzles adjacent the upper end of said housing, and means for forcing a current of air upwardly through said housing.

BURTON A. OLSEN.